US012037970B2

(12) United States Patent
Rasmussen

(10) Patent No.: US 12,037,970 B2
(45) Date of Patent: Jul. 16, 2024

(54) WATER POWERED ELECTRICITY GENERATING ASSEMBLY

(71) Applicant: Kimball Rasmussen, Hurricane, UT (US)

(72) Inventor: Kimball Rasmussen, Hurricane, UT (US)

( * ) Notice: Subject to any disclaimer, the term of this patent is extended or adjusted under 35 U.S.C. 154(b) by 262 days.

(21) Appl. No.: 17/690,444

(22) Filed: Mar. 9, 2022

(65) Prior Publication Data

US 2023/0287860 A1 Sep. 14, 2023

(51) Int. Cl.
*F03B 13/14* (2006.01)

(52) U.S. Cl.
CPC .... *F03B 13/145* (2013.01); *F05B 2260/4022* (2013.01); *F05B 2260/60* (2013.01)

(58) Field of Classification Search
CPC ...... F03B 13/145; F03B 7/006; F03B 17/005; F05B 2260/4022; F05B 2260/60
USPC .................................................. 60/639; 415/5
See application file for complete search history.

(56) References Cited

U.S. PATENT DOCUMENTS 1,483,505 A * 2/1924 Bradshaw ............... F03B 7/006 415/5
3,983,704 A * 10/1976 McFarland ............... F03G 6/00 60/682
3,984,698 A 10/1976 Brewer
4,049,300 A * 9/1977 Schneider ................. F03D 9/22 416/7
4,112,686 A * 9/1978 Trotta ........................ F03G 3/00 415/5
4,163,905 A * 8/1979 Davison ................ F03B 17/068 416/8
4,242,868 A * 1/1981 Smith ................... F03B 17/066 415/5
4,260,902 A 4/1981 Crider
5,661,770 A * 8/1997 Spinks ................... G21C 15/18 376/298
6,445,078 B1 9/2002 Cieslak
6,981,376 B2 1/2006 Dutta
7,222,487 B1 5/2007 Hinkley
7,918,087 B1 * 4/2011 Brown .................... F03B 7/006 60/398
8,266,907 B2 9/2012 Barrett
2003/0127860 A1 7/2003 Baron

FOREIGN PATENT DOCUMENTS

WO WO2015067287 5/2015

* cited by examiner

*Primary Examiner* — Hoang M Nguyen

(57) ABSTRACT

A water powered electricity generating assembly for continuous generation of electricity includes an endless track, which is rotationally engaged to a stand. The trays hingedly engaged to the endless track are uprightly and invertedly positioned on a first side and second sides of the endless track, respectively. A generator is operationally engaged to the endless track. A supply pipe is engaged to and extends from the stand so that a first end of the supply pipe opens above the first side of the endless track. The supply pipe extends to a water source at an elevation higher than the upper end of the stand and diverts water from the water source to the stand. The water fills the trays on the first side of the endless track, causing the endless track and the generator to rotate, thereby generating an electrical current.

16 Claims, 4 Drawing Sheets

WATER POWERED ELECTRICITY GENERATING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to electricity generating assemblies and more particularly pertains to a new electricity generating assembly for continuous generation of electricity. The present invention discloses an electricity generating assembly comprising trays hingedly engaged to an endless track, which is operationally engaged to a generator. Water diverted from an uphill water source is conveyed by a supply pipe to an upper end of a tower, to which the endless track is engaged. The water sequentially fill the trays when positioned at an upper end of the endless track.

(2) Description of Related Art Including Information Disclosed Under 37 CFR 1.97 and 1.98

The prior art relates to electricity generating assemblies. The prior art may comprise water wheels and fluid driven rotary engines. What is lacking in the prior art is an electricity generating assembly comprising trays hingedly engaged to an endless track, which is operationally engaged to a generator. Water diverted from an uphill water source is conveyed by a supply pipe to an upper end of a tower, to which the endless track is engaged. The water sequentially fill the trays when positioned at an upper end of the endless track.

(h) BRIEF SUMMARY OF THE INVENTION

An embodiment of the disclosure meets the needs presented above by generally comprising an endless track, which is rotationally engaged to a stand. The endless track extends substantially between an upper end and a lower end of the stand. Each of a plurality of trays is hingedly engaged to the endless track. The trays are uprightly positioned on a first side of the endless track and invertedly positioned on a second side of the endless track. A generator is operationally engaged to the endless track and is configured to generate an electrical current. A supply pipe is engaged to and extends from the stand so that a first end of the supply pipe opens above the first side of the endless track. The supply pipe is configured to extend to a water source at an elevation higher than the upper end of the stand. The supply pipe is configured to divert water from the water source to the stand so that the water fills the trays on the first side of the endless track. The mass of the water is configured to rotate the endless track so that the generator rotates and generates the electrical current.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
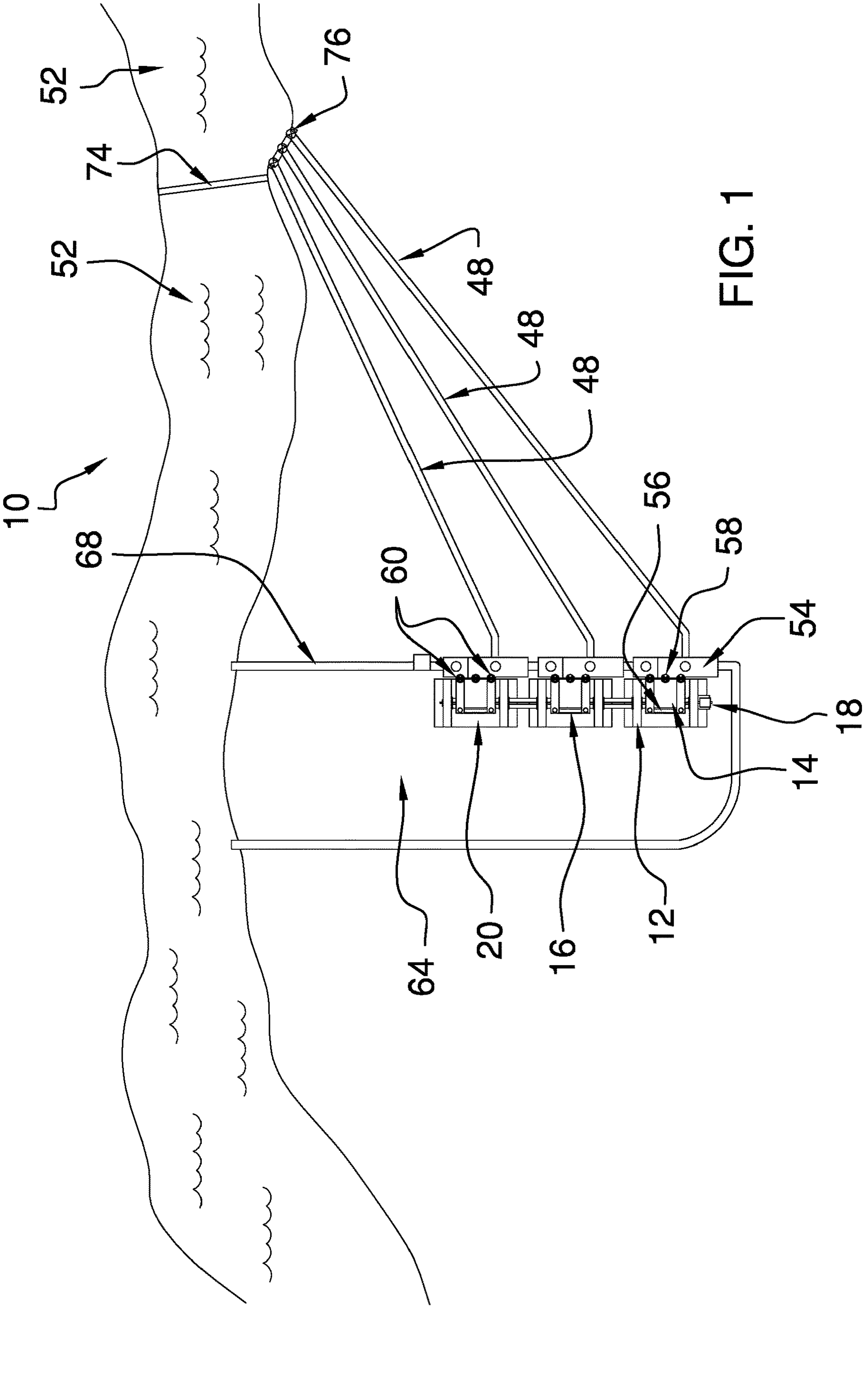
FIG. 1 is an in-use view of a water powered electricity generating assembly according to an embodiment of the disclosure.
Figure 2:
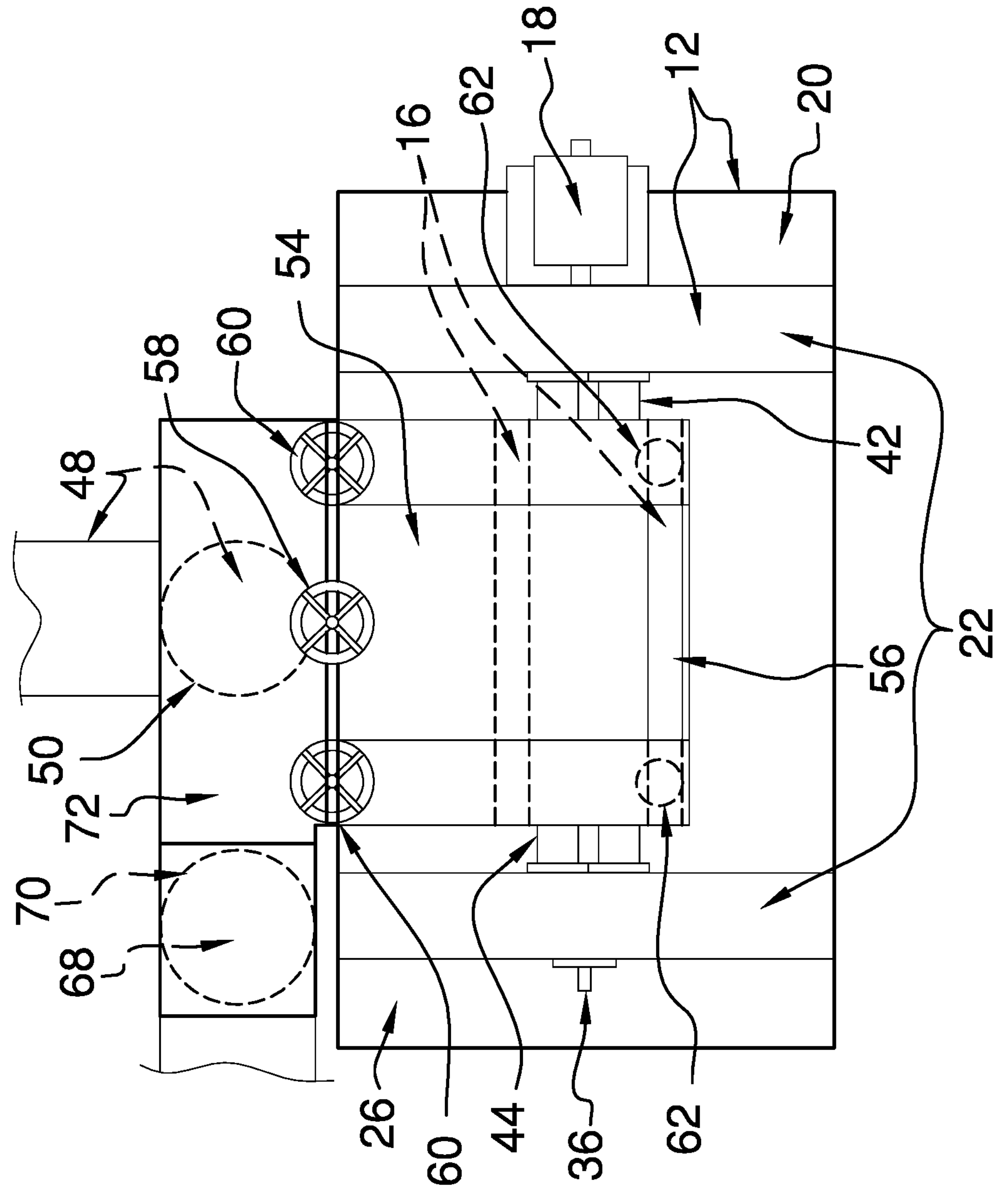
FIG. 2 is a top view of an embodiment of the disclosure.

With reference now to the drawings, and in particular to FIGS. 1 through 4 thereof, a new electricity generating assembly embodying the principles and concepts of an embodiment of the disclosure and generally designated by the reference numeral 10 will be described.

As best illustrated in FIGS. 1 through 4, the water powered electricity generating assembly 10 generally comprises a stand 12, an endless track 14, a plurality of trays 16, and a generator 18. The stand 12 may comprise a slab 20, a pair of towers 22, and a plurality of crossbeams 24. The towers 22 are engaged to and extend substantially perpendicularly from the slab 20. The crossbeams 24 are engaged to and extends between the towers 22. The present invention anticipates other configurations of the stand 12, such as, but not limited to, rectangular housings and the like.

The endless track 14 is rotationally engaged to the stand 12 and extends substantially between an upper end 26 and a lower end 28 of the stand 12. The endless track 14 comprises a pair of shafts 30, a plurality of sprockets 32, and a plurality of endless chains 34. The shafts 30 are rotationally engaged to and extend between the towers 22. The sprockets 32 are engaged to the pair of shafts 30. The plurality of sprockets 32 may comprise six sprockets 32, which are engaged three apiece to each shaft 30. The present invention anticipates the plurality of sprockets 32 comprising other numbers of sprocket 32, such as, but not limited to, four sprockets 32, eight sprockets 32, and the like. Each endless chain 34 is gearedly engaged to a respective sprocket 32, which is positioned on an upper one 36 of the shafts 30, and an associated sprocket 32, which is positioned on a lower one 38 of the shafts 30. The present invention also anticipates endless belts (not shown) being utilized in place of the endless chains 34.

Each of a plurality of chain guides 40 is engaged to the crossbeams 24 and extends along a respective endless chain 34 on a respective one of a first side 42 and a second side 44 of the endless track 14. Each of a plurality of tensioners 46 is engaged to a respective tower 22 and is operationally engaged to a respective shaft 30. The tensioner 46 is positioned to adjust the respective shaft 30 relative to the respective tower 22 to adjust tension on the endless chains 34.

Figure 3:
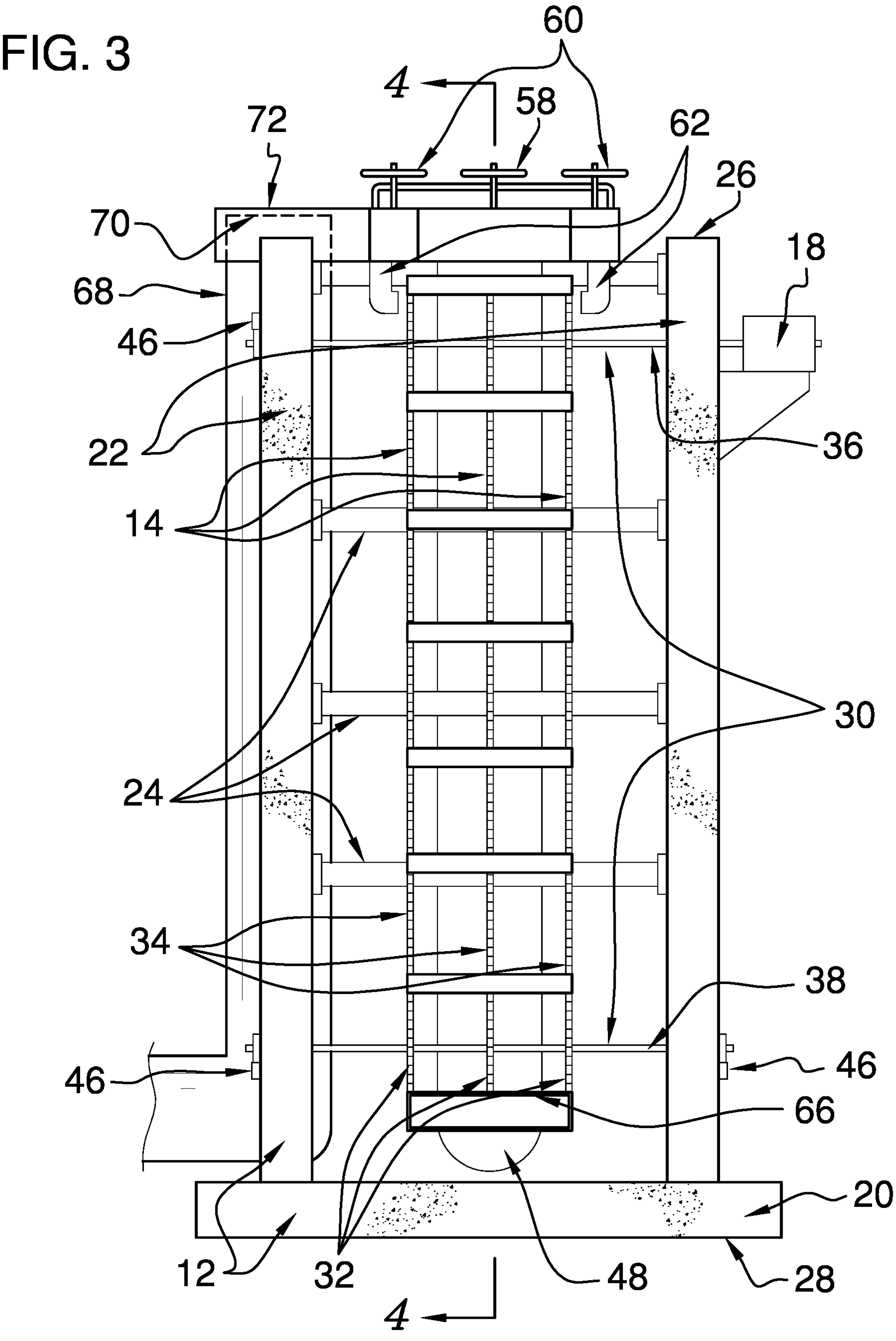
FIG. 3 is a front view of an embodiment of the disclosure.
Figure 4:
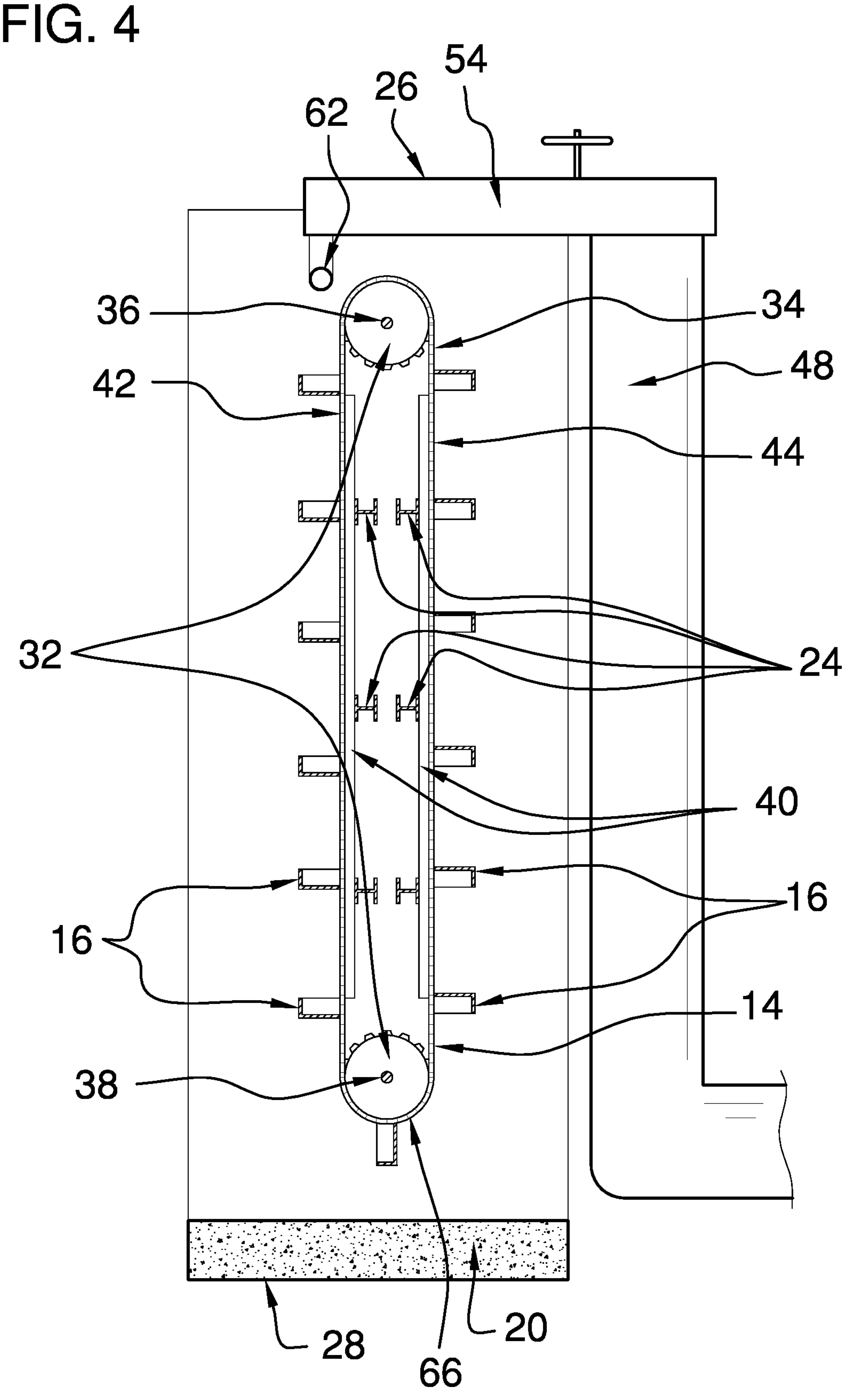
FIG. 4 is a cross-sectional view of an embodiment of the disclosure.

Each of the trays 16 is hingedly engaged to the endless track 14. The trays 16 are uprightly positioned on the first side 42 of the endless track 14 and invertedly positioned on the second side 44 of the endless track 14, as shown in FIG. 4. Each tray 16 may be substantially cuboid, as shown in FIGS. 3 and 4, or alternative shaped, such as, but not limited to, cylindrical, triangular prism, and the like.

The generator 18 is operationally engaged to the endless track 14 and is configured to generate an electrical current. As shown in FIG. 3, the generator 18 is operationally engaged to a respective one of the shafts 30. The present invention also anticipates a gear box (not shown) operationally engaged to and positioned between the generator 18 and the endless track 14 to provide speed and torque conversions.

A supply pipe 48 is engaged to and extends from the stand 12 so that a first end 50 of the supply pipe 48 opens above the first side 42 of the endless track 14. The supply pipe 48 is configured to extend to a water source 52, such as a stream, creek, or the like, at an elevation higher than the upper end 26 of the stand 12. As shown in FIG. 4, the supply pipe 48 extends downwardly from the upper end 26 of the stand 12 to proximate to the lower end 28 of the stand 12 and then upwardly to the water source 52.

The supply pipe 48 is configured to divert water from the water source 52 to the stand 12 so that the water fills the trays 16 on the first side 42 of the endless track 14. The mass of the water is configured to rotate the endless track 14 so that the generator 18 rotates and generates the electrical current. The present invention anticipates multiple water powered electricity generating assemblies 10 being positioned together, as shown in FIG. 1, wherein three water powered electricity generating assemblies 10 are shown engaged to a single generator 18. The present invention also anticipates multiple water powered electricity generating assemblies 10 being positioned in series along a water source 52, with the water being reused as it drains downhill from one water powered electricity generating assembly 10 to the next.

A supply basin 54 is engaged to the stand 12 proximate to the upper end 26. The supply basin 54 is configured to receive water from the supply pipe 48. A slot 56 is positioned in the supply basin 54 above the first side 42 of the endless track 14. The slot 56 is configured to allow water to pass from the supply basin 54 to the trays 16 on the first side 42 of the endless track 14. A primary valve 58 is engaged to the supply pipe 48 proximate to the first end 50 and is configured to control a flow of water from the supply pipe 48 into the supply basin 54.

A pair of secondary valves 60 is engaged to the supply pipe 48 proximate to the first end 50. Each of a pair of secondary pipes 62 is engaged to and extends from a respective secondary valve 60 to a position above the first side 42 of the endless track 14. The respective secondary valve 60 is configured to control a flow of water from the supply pipe 48 through the secondary pipe 62 into trays 16 positioned on the first side 42 of the endless track 14. It is anticipated that the secondary valves 60 can be used to top off the trays 16 as may be required should flow through the slot 56 be insufficient to fill the trays 16.

A catch basin 64 extends from the lower end 28 of the stand 12 to the water source 52, as shown in FIG. 1. The catch basin 64 is configured to return the water emptied from the trays 16 at a bottom 66 of the endless track 14 to the water source 52.

A bypass pipe 68 is engaged to and extends downwardly from the supply basin 54. The bypass pipe 68 is in fluidic communication with the supply basin 54 and has an upward end 70 that is positioned proximate to an upper limit 72 of the supply basin 54. The bypass pipe 68 is configured to drain water from the supply basin 54 when a water level within the supply basin 54 reaches the upward end 70 of the bypass pipe 68. The bypass pipe 68 may extend to the catch basin 64 or back to the water source 52. A weir wall 74, which extends from a second end 76 of the supply pipe 48 into the water source 52, is configured to direct water from the water source 52 into the second end 76 of the supply pipe 48.

In use, the weir wall 74 direct waters from the water source 52 into the second end 76 of the supply pipe 48. The water passes through the supply pipe 48 and fills the trays 16 on the first side 42 of the endless track 14, causing the endless track 14 and the generator 18 to rotate, thereby generating an electrical current.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water powered electricity generating assembly comprising:

a stand;

an endless track rotationally engaged to the stand and extending substantially between an upper end and a lower end of the stand;

a plurality of trays, each tray being hingedly engaged to the endless track, such that the trays are uprightly positioned on a first side of the endless track and invertedly positioned on a second side of the endless track;

a generator operationally engaged to the endless track and being configured for generating an electrical current;

a supply pipe engaged to and extending from the stand such that a first end of the supply pipe opens above the first side of the endless track, the supply pipe being configured to extend to a water source at an elevation higher than the upper end of the stand, wherein the supply pipe is configured for diverting water from the water source to the stand, such that the water fills the trays on the first side of the endless track, wherein the mass of the water is configured for rotating the endless track, such that the generator rotates and generates the electrical current;

a supply basin engaged to the stand proximate to the upper end, wherein the supply basin is configured for receiving water from the supply pipe;

a slot positioned in the supply basin above the first side of the endless track, wherein the slot is configured for passing of water from the supply basin to the trays on the first side of the endless track;

a primary valve engaged to the supply pipe proximate to the first end, wherein the primary valve is configured for controlling a flow of water from the supply pipe into the supply basin;

a pair of secondary valves engaged to the supply pipe proximate to the first end; and a pair of secondary pipes, each secondary pipe being engaged to and extending from a respective secondary valve to a position above the first side of the endless track, wherein the respective secondary valve is configured for controlling a flow of water from the supply pipe through the secondary pipe into trays positioned on the first side of the endless track.

2. The water powered electricity generating assembly of claim 1, wherein the stand comprises:

a slab;

a pair of towers engaged to and extend substantially perpendicularly from the slab; and a plurality of crossbeams engaged to and extending between the towers.

3. The water powered electricity generating assembly of claim 2, wherein the endless track comprises:

a pair of shafts rotationally engaged to and extending between the towers, the generator being operationally engaged to a respective one of the shafts;

a plurality of sprockets engaged to the pair of shafts; and a plurality of endless chains, each endless chain being gearedly engaged to a respective sprocket positioned on an upper one of the shafts and an associated sprocket positioned on a lower one of the shafts.

4. The water powered electricity generating assembly of claim 3, wherein the plurality of sprockets comprising six sprockets engaged three apiece to each shaft.

5. The water powered electricity generating assembly of claim 3, further including a plurality of chain guides, each chain guide being engaged to the crossbeams and extending along a respective endless chain on a respective one of the first side and the second side of the endless track.

6. The water powered electricity generating assembly of claim 1, further including a plurality of tensioners, each tensioner being engaged to a respective tower and operationally engaged to a respective shaft, such that the tensioner is positioned for adjusting the respective shaft relative to the respective tower for adjusting tension on the endless chains.

7. The water powered electricity generating assembly of claim 1, wherein each tray is substantially cuboid.

8. The water powered electricity generating assembly of claim 1, wherein the supply pipe extends downwardly from the upper end of the stand to proximate to the lower end of the stand and then upwardly to the water source.

9. The water powered electricity generating assembly of claim 1, further including a catch basin extending from the lower end of the stand to the water source, wherein the catch basin is configured for returning the water emptied from the trays at the bottom of the endless track to the water source.

10. The water powered electricity generating assembly of claim 9, further including a bypass pipe engaged to and extending downwardly from the supply basin, such that the bypass pipe is in fluidic communication with the supply basin, the bypass pipe having an upward end positioned proximate to an upper limit of the supply basin, wherein the bypass pipe is configured for draining water from the supply basin when a water level within the supply basin reaches the upward end of the bypass pipe.

11. The water powered electricity generating assembly of claim 10, wherein the bypass pipe extends to the catch basin.

12. The water powered electricity generating assembly of claim 1, further including a weir wall extending from a second end of the supply pipe into the water source, wherein the weir wall is configured for directing water from the water source into the second end of the supply pipe.

13. A water powered electricity generating system comprising:

a water source;

a stand;

an endless track rotationally engaged to the stand and extending substantially between an upper end and a lower end of the stand;

a plurality of trays, each tray being hingedly engaged to the endless track, such that the trays are uprightly positioned on a first side of the endless track and invertedly positioned on a second side of the endless track;

a generator operationally engaged to the endless track and being configured for generating an electrical current;

a supply pipe engaged to and extending from the stand such that a first end of the supply pipe opens above the first side of the endless track, the supply pipe extending to a water source at an elevation higher than the upper end of the stand, wherein the supply pipe is configured for diverting water from the water source to the stand, such that the water fills the trays on the first side of the endless track, wherein the mass of the water is configured for rotating the endless track, such that the generator rotates and generates the electrical current;

a supply basin engaged to the stand proximate to the upper end, wherein the supply basin is configured for receiving water from the supply pipe;

a slot positioned in the supply basin above the first side of the endless track, wherein the slot is configured for passing of water from the supply basin to the trays on the first side of the endless track;

a primary valve engaged to the supply pipe proximate to the first end, wherein the primary valve is configured for controlling a flow of water from the supply pipe into the supply basin;

a pair of secondary valves engaged to the supply pipe proximate to the first end;

a pair of secondary pipes, each secondary pipe being engaged to and extending from a respective secondary valve to a position above the first side of the endless track, wherein the respective secondary valve is configured for controlling a flow of water from the supply pipe through the secondary pipe into trays positioned on the first side of the endless track;

a catch basin extending from the lower end of the stand to the water source, wherein the catch basin is configured for returning the water emptied from the trays at the bottom of the endless track to the water source; and a bypass pipe engaged to and extending downwardly from the supply basin, such that the bypass pipe is in fluidic communication with the supply basin, the bypass pipe having an upward end positioned proximate to an upper limit of the supply basin, wherein the bypass pipe is configured for draining water from the supply basin when a water level within the supply basin reaches the upward end of the bypass pipe.

14. The water powered electricity generating system of claim 13, wherein:

the stand comprises:

a slab, a pair of towers engaged to and extend substantially perpendicularly from the slab, and a plurality of crossbeams engaged to and extending between the towers; and the endless track comprises:

a pair of shafts rotationally engaged to and extending between the towers, the generator being operationally engaged to a respective one of the shafts, a plurality of sprockets engaged to the pair of shafts, and a plurality of endless chains, each endless chain being gearedly engaged to a respective sprocket positioned on an upper one of the shafts and an associated sprocket positioned on a lower one of the shafts.

15. The water powered electricity generating system of claim 13, further including a weir wall extending from a second end of the supply pipe into the water source, wherein the weir wall is configured for directing water from the water source into the second end of the supply pipe.

16. A water powered electricity generating assembly comprising:

a stand, the stand comprising:

a slab, a pair of towers engaged to and extend substantially perpendicularly from the slab, and a plurality of crossbeams engaged to and extending between the towers;

an endless track rotationally engaged to the stand and extending substantially between an upper end and a lower end of the stand, the endless track comprising:

a pair of shafts rotationally engaged to and extending between the towers, a plurality of sprockets engaged to the pair of shafts, the plurality of sprockets comprising six sprockets engaged three apiece to each shaft, a plurality of endless chains, each endless chain being gearedly engaged to a respective sprocket positioned on an upper one of the shafts and an associated sprocket positioned on a lower one of the shafts, a plurality of chain guides, each chain guide being engaged to the crossbeams and extending along a respective endless chain on a respective one of a first side and a second side of the endless track, and a plurality of tensioners, each tensioner being engaged to a respective tower and operationally engaged to a respective shaft, such that the tensioner is positioned for adjusting the respective shaft relative to the respective tower for adjusting tension on the endless chains;

a plurality of trays, each tray being hingedly engaged to the endless track, such that the trays are uprightly positioned on the first side of the endless track and invertedly positioned on the second side of the endless track, each tray being substantially cuboid;

a generator operationally engaged to the endless track and being configured for generating an electrical current, the generator being operationally engaged to a respective one of the shafts;

a supply pipe engaged to and extending from the stand such that a first end of the supply pipe opens above the first side of the endless track, the supply pipe being configured to extend to a water source at an elevation higher than the upper end of the stand, wherein the supply pipe is configured for diverting water from the water source to the stand, such that the water fills the trays on the first side of the endless track, wherein the mass of the water is configured for rotating the endless track, such that the generator rotates and generates the electrical current, the supply pipe extending downwardly from the upper end of the stand to proximate to the lower end of the stand and then upwardly to the water source;

a supply basin engaged to the stand proximate to the upper end, wherein the supply basin is configured for receiving water from the supply pipe;

a slot positioned in the supply basin above the first side of the endless track, wherein the slot is configured for passing of water from the supply basin to the trays on the first side of the endless track;

a primary valve engaged to the supply pipe proximate to the first end, wherein the primary valve is configured for controlling a flow of water from the supply pipe into the supply basin;

a pair of secondary valves engaged to the supply pipe proximate to the first end;

a pair of secondary pipes, each secondary pipe being engaged to and extending from a respective secondary valve to a position above the first side of the endless track, wherein the respective secondary valve is configured for controlling a flow of water from the supply pipe through the secondary pipe into trays positioned on the first side of the endless track;

a catch basin extending from the lower end of the stand to the water source, wherein the catch basin is configured for returning the water emptied from the trays at the bottom of the endless track to the water source;

a bypass pipe engaged to and extending downwardly from the supply basin, such that the bypass pipe is in fluidic communication with the supply basin, the bypass pipe having an upward end positioned proximate to an upper limit of the supply basin, wherein the bypass pipe is configured for draining water from the supply basin when a water level within the supply basin reaches the upward end of the bypass pipe, the bypass pipe extending to the catch basin; and a weir wall extending from a second end of the supply pipe into the water source, wherein the weir wall is configured for directing water from the water source into the second end of the supply pipe.

* * * * *